United States Patent Office 3,057,839
Patented Oct. 9, 1962

3,057,839
ACETYLENE POLYMERIZATION AND POLYMERS
Harold H. Zeiss, Dayton, Ohio, assignor to Monsanto Chemical Company, St. Louis, Mo., a corporation of Delaware
No Drawing. Filed Apr. 23, 1958, Ser. No. 730,278
16 Claims. (Cl. 260—94.1)

This invention relates to aromatic-like products of acetylenes and methods of producing same.

In one aspect the invention is directed to the polymerization of acetylenes capable of forming Grignard reagents by preparation of such acetylenic Grignard reagents and treatment of same with reducible transition metal compounds. The invention is further directed to the step of reacting acetylenic Grignard reagents with reducible transition metal compounds to produce acetylene polymers. The invention particularly concerns the use of transition metal halides in the foregoing processes.

The invention is further directed to polymers of acetylen possessing graphitic character. The invention is further directed to such polymers containing transition metal elements or oxygen, along with the elements carbon and hydrogen.

In another aspect the invention is directed to the polymerization of acetylenes in the presence of aluminum trihalide, chromium trihalide and aluminum.

The formation of aromatic $\pi$-complexes with chromium through reaction of chromic trichloride with aromatic $\pi$-electron systems has previously been established. The present invention involves the formation of such $\pi$-complexes by reaction of more reactive $\pi$-electron systems as found in the acetylenes. It appears that the $\pi$-complexing electrons are activated by metal substituents, e.g., bromo-magnesium, or by heat and aluminum chloride, together with the consequent reduction of a transition metal. The resulting $\pi$-complex is represented:

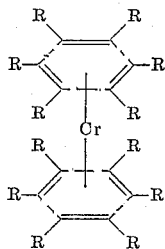

in which R represents H, MgBr, or organic residues such as aliphatic or aryl radicals; R will correspond to the substituents on the acetylenes employed, and the substituents on the acetylene reactants disclosed herein below serve as further examples of substituents which R represents. The above $\pi$-complex is to a large extent converted to a higher acetylene polymer in the reaction, but the aromatic character is still retained to a certain degree as evidenced by infrared spectra as described below.

The acetylenic polymers of the present invention are for the most part amorphous in character and resemble graphite or charcoal in their properties. The polymers will be useful as fillers in plastic materials, e.g., rubber, polyvinyl chloride, etc., and for their absorbent properties; because of their metal content, the polymers will also have some value as anti-static agents in such applications. In addition, the aromatic character of the polymers is of fundamental importance; the planar configuration of aromatic rings makes possible a graphite-like structure and consequent utility in lubrication applications.

The reactions of the acetylenic Grignard reagents with reducible transition metal compounds as disclosed herein can be effected under a variety of reaction conditions and proportions of reactants, and the character of the resulting product can be modified thereby to some extent. For example, from 1 to 20 or so moles acetylenic Grignard reagent can be provided for reaction with 1 mole of transition metal compound such as chromium trichloride; however, it is generally desirable to have at least 2 moles acetylenic Grignard reagent, and for preparing thermally stable, non-pyrophoric polymers from acetylene magnesium bromide, 2 to 6 or so moles are usually employed, although 8 moles still give a fairly non-pyrophoric product; for pyrophoric products, 10 to 15 or the like moles of acetylenemagnesium bromide can be employed. Hydrolysis, of course, converts even the pyrophoric product into a non-pyrophoric stable polymer.

In general, the reaction conditions employed for the reactions of acetylenic Grignard reagents herein will be those ordinarily employed for Grignard reactions. Ordinary precautions will be taken to avoid undue destruction of Grignard reagent by moisture, oxygen, etc. The use of Grignard conditions in the Grignard reactions of bis-arene chromium complexes is discussed in my copending application Serial No. 649,640, filed April 1, 1957, and any of the conditions, solvents, etc. disclosed therein are applicable here, the disclosure of the said application being incorporated herein by reference. Of course, it will be understood that the reaction will ordinarily be effected at a temperature which permits the reaction to proceed at a substantial but controllable rate, the same ordinarily being accomplished in the case of a new combination of acetylenic Grignard compound and reducible transition metal compound by mixing the components at low temperature and permitting the reaction mixture to warm up until substantial reaction is observed.

As acetylenic Grignard reagents for use in the present process, any compounds of the structure R—C≡CMgX in which R is a hydrogen atom or a monovalent organic radical and X is a halogen are suitable, so long as the compounds contain no groups which interfere unduly in the polymerization reaction. Ordinarily it will be preferred that R be hydrocarbon, and alkyl or aryl (including aralkyl and alkaryl) radicals are usually employed. The presence of reactive hydrogen atoms or other groups capable of reacting with or destroying Grignard reagent will ordinarily be avoided in order that the desired polymerization will proceed in a straight-forward manner. However, the presence of such groups does not render the process inoperative; it will be noted that acetylenemagnesium bromide contains an active hydrogen atom and was nevertheless successfully employed in the process. Examples of some of the hydrocarbon acetylenic Grignard reagents which are ordinarily employed are methylacetylenemagnesium bromide, ethylacetylenemagnesium bromide, propylacetylenemagnesium bromide, isopropylacetylenemagnesium bromide, n-butylacetylmagnesium bromide, isobutylacetylenemagnesium bromide, t-butylacetylmagnesium bromide, pentylacetylenemagnesium bromide, hexylacetylenemagnesium bromide, heptylacetylenemagnesium bromide, octylacetylenemagnesium bromide, decylacetylenemagnesium bromide, phenylmethlyacetylenemagnesium bromide, phenylacetylenemagnesium bromide, tolylacetylenemagnesium bromide (o-, m-, and p-isomers), xylyl acetylenemagnesium bromide, naphthylacetylenemagnesium bromides, etc. The acetylenic Grignard reagents employed can contain up to 20 or more carbon atoms, but will more often contain 2 to 10 carbon atoms. It is possible to employ acetylene with both hydrogens replaced by metallic radical as the acetylenic Grignard reagent, as for example BrMg—C≡C—MgBr. It is also possible to employ acetylenic Grignard agents containing an R substituent in which the R contains unsaturated linkages, as in polyacetylene compounds. It is also possible to employ di-substituted acetylene compounds, e.g., 2-butyne, in combination with the acetylenic Grignard agents, and, of course, mono-substituted acetylenes or acetylene itself can be similarly employed.

The acetylenic Grignard reagents for use herein are ordinarily prepared by reaction of acetylene or a substituted acetylene with a Grignard reagent, preferably a hydrocarbon Grignard reagent; alkyl or aryl Grignard reagents containing up to 10 or so carbon atoms will ordinarily be employed, e.g., methylmagnesium chloride, ethylmagnesium bromide, phenylmagnesium bromide, etc.

In the above formula of acetylenic Grignard reagents for use herein, bromine is ordinarily preferred as the halogen, but iodine and chlorine are also useful, and it may often be desirable to use chlorine for reasons of economics. Fluorine is also applicable although it will not ordinarily be selected for use. It will be realized that any of the halogens can be substituted for bromine in the examples of acetylenic Grignard reagents disclosed herein.

While the description of the processes herein is particularly directed to the reactions of acetylides of the classical Grignard type, it will be understood that other metallic acetylides, e.g., sodium, lithium, zinc and cadmium acetylides, can be used under some conditions.

In general, in the illustrative procedures set forth herein chromium trichloride will be utilized as a prototype of reducible transition metal compounds, but it will be realized that chromium trifluoride, chromium tribromide, chromium triiodide, or other halides of chromium can be substituted in place of the chromium trichloride.

The following examples are illustrative of the invention.

Example 1

A diethyl ether solution of ethylmagnesium bromide was treated at room temperature with an approximately equimolar amount of acetylene in ether solution to precipitate a salt, presumably $(C \equiv C)(MgBr)_2$. Chromium trichloride was then added to the ether in the ratio of 1 mole to 6 moles of the di-bromomagnesium salt and permitted to react at room temperature to produce a black material. Hydrolysis of the black material with dilute acid gave a solid which was then partially dissolved by pyridine. The pyridine-insoluble portion was a black material which was insoluble in organic solvents. From the pyridine solution a brown material was precipitated by addition of water. Both the black and the brown products were thermostable up to 300° C. and were amorphous according to X-ray patterns; infrared spectra exhibited mono-substituted aromatic absorption bands at 13.2 and 14.25 microns. The products contained chromium, the amount in the pyridine-soluble product being about 4%. When the ethylmagnesium bromide above is replaced with phenylmagnesium bromide, the same products are produced.

Example 2

An ethereal solution of phenylmagnesium bromide was added at room temperature to a suspension of $CrCl_3$ in acetylene-saturated ether. The resulting brown-to-black solid was hydrolyzed with dilute acid and separated into pyridine-soluble and insoluble fractions as in Example 1. Both fractions exhibited the properties noted in Example 1 and contained better than 4% chromium. Analysis of the soluble fraction indicated an empirical formula of approximately $C_{108}H_{94}O_{14}Cr$. The amorphous character of these products makes them useful as absorbents for dyes, coloring materials, various impurities and the like.

Example 3

Ethylmagnesium bromide was added to tetrahydrofuran containing enough acetylene to react with the added agent; the resulting solution of $CH \equiv C—MgBr$ was then treated with $CrCl_3$ in an amount of 1 mole per 2 moles of the acetylenic Grignard reagent to produce a black, thermally stable material with properties comparable with those of charcoal. The material was stable to oxygen and water. The material was produced regardless of whether low or high reaction temperatures were employed, e.g., from −30° C. to the boiling point of tetrahydrofuran (70° C.) or higher, and regardless of the order of addition of the reactants.

Example 4

When the reaction was conducted according to Example 3 but utilizing an 8 to 1 mole ratio of acetylenic Grignard reagent to $CrCl_3$, a similar polymer was produced except that it was stable to oxygen for a shorter time. Hydrolysis with dilute acid introduced oxygen into the polymeric structure. The products of Examples 3 and 4 will be useful in applications for which charcoal, carbon black and the like are employed, i.e., as absorbents, fillers, etc.

Example 5

The reaction was conducted according to Example 3 but 10 moles of $HC \equiv C—MgBr$ were employed for each mole of $CrCl_3$. The resulting product was similar to those of the previous examples except that it was pyrophoric. The procedure was repeated and the product was hydrolyzed with dilute acid to produce 700 mg. of material for 400 mg. of $CrCl_3$ reactant; the hydrolyzed product analyzed as: C, 65.13; H, 5.80; O, 19.61; Cr, 3.63 and 3.50. Thermal decomposition of the hydrolyzed material above 400° C. at 20 mm. Hg produced a black solid having an infrared spectrum resembling that of graphite. *Analysis.*—C, 78.09; H, 3.09; O, 6.19; Cr, 7.08. The introduction of oxygen into the product by hydrolysis is presumed to take place by hydration of the acetylenic bond at terminal positions. Thermal decomposition to produce the graphite like material is indicated as proceeding:

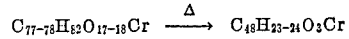

$$C_{77-78}H_{52}O_{17-18}Cr \xrightarrow{\Delta} C_{48}H_{23-24}O_3Cr$$

Example 6

An ether mixture of $H_3C—C \equiv C—MgBr$ was prepared by adding ethylmagnesium bromide to a solution of methyl acetylene in ether. To the stirred ethereal mixture containing 320 millimoles of $H_3C—C \equiv C—MgBr$, 32 millimoles of $CrCl_3$ was added. The materials reacted slowly at reflux to produce a dark material which was then hydrolyzed with acid to produce pyridine-soluble and insoluble fractions. Variation in the temperature and other reaction conditions did not substantially alter the result.

Example 7

A solution of methylmagnesium bromide in tetrahydrofuran was prepared and treated with $CrCl_3$ in a mol ratio of 8 of the acetylenic Grignard to 1 of the halide of chromium. The reaction went smoothly at room temperature and acid hydrolysis of the resulting material gave 0.3 gram product for 0.16 gram of $CrCl_3$ reacted. The dark brown hydrolysis product was completely soluble in pyridine, slightly soluble in benzene and almost insoluble in acetone. *Analysis.*—C, 42.49; H, 6.24; O, 23.44; ash, 27.58. The same reaction with 12:1 mol ratio gave 0.5 gram of dark brown product for 0.16 gram $CrCl_3$, was completely souble in pyridine and more soluble in benzene and acetone than the 8:1 mol ratio product. *Analysis.*—C, 69.70; H, 7.30; O, 14.51; ash, 4.69.

Example 8

Phenylacetylenemagnesium bromide was prepared from ethylmagnesium bromide and phenylacetylene in tetrahydrofuran solution and was quite soluble in the tetrahydrofuran; (phenylmagnesium bromide would also be suitable for this preparation). Reaction with $CrCl_3$ (3 grams) in mol ratio of Grignard reagent: $CrCl_3$ of 6:1 proceeded rapidly and smoothly at −5° C. to give a clear, brown solution. After acid hydrolysis, the reaction product was taken up in benzene (completely soluble), dried over KOH and isolated as a viscous, dark brown material by evaporation of the benzene. Vacuum drying gave 13.4 grams of dry, brown powder which was completely soluble in benzene, chloroform, carbon tetrachloride, tetrahydrofuran, dioxane, pyridine and carbon disulfide. It also dissolved in ether, acetone and ethyl acetate but left some residue. The powder contained 1.7% chromium. *Analysis.*—C, 67.73; H, 4.25; O, 9.02; ash, 20.81.

Soxhlet extraction with ether removed 80% of the crude product, leaving an inorganic residue amounting to about 20% of the crude product. Evaporation of the ether left a dark brown solid product which was completely soluble in all the above organic solvents. *Analysis.*—C, 91.90; H, 5.36; O, 0.00; ash, 3.73. Correcting the values for carbon and hydrogen to 100% gives an empirical formula for this product of polyphenylacetylene. The product has a softening point between 175° and above 200°, a gram-molecular weight of 600 to 1000 or more and is amorphous according to X-ray pattern. This product is suitable as an absorbent for coloring materials, as a filler for rubber, etc.

*Example 9*

Repetition of the procedure of Example 8 but using 2.2 grams of anhydrous $NiBr_2$ in place of chromic trichloride gave 6.1 grams of crude product corresponding to and having the solubility properties of that made with $CrCl_3$. Ether extraction of the crude product produced a product free of ash but containing oxygen. *Analysis.*—C, 90.48; H, 5.40; O, 5.19; ash, 0.00. The analysis corresponds to an empirical formula of $C_{24}H_{15-16}O$.

*Example 10*

Phenylacetylene was reacted in n-hexane for 10 hours in a Schlenk tube under Fischer-Hafner conditions (Z. Naturforsch. 10*b*, 665 (1955) and Z. Anorg. Chem., 286, 146 (1956)). The phenylacetylene was employed in proportion of about 2 moles for 1 mole of chromium trichloride, 1 mole of aluminum, and 1 mole of aluminum chloride and the components were heated from about 125° C. to 175° C. under nitrogen. The reaction mixture was solvolyzed in ethanol, filtered and evaporated to dryness to give a brown product closely resembling the crude products of Examples 8 and 9. By acetone extraction a product was obtained which resembled the final product of the two preceding sections. *Analysis.*—C, 90.26; H, 5.88; O, 2.04; ash, 0.00.

It will be realized that the polymerization above can be effected using other proportions of the components, e.g., $CrCl_3$, 2 to 4 moles; Al, 1 to 4 moles; $AlCl_3$, 1 to 5 moles; and phenylacetylene, 4 to 10 moles. Moreover, the process is applicable to acetylene itself and the various substituted acetylenes disclosed as applicable above with respect to processes utilizing acetylenic Grignard reagents.

What is claimed is:

1. The method of preparing polymers of acetylene containing aromatic structure which comprises treating a compound of the formula R—C≡C—MgX with a metal halide selected from the group consisting of nickel halide and chromium halide, the R—C≡C— in said compound being completely hydrocarbon, and X being a halogen.

2. The process of claim 1 in which R is selected from the group consisting of hydrogen and monovalent saturated hydrocarbon radicals of up to 10 carbon atoms.

3. The process of claim 1 in which R is methyl.

4. The process of claim 1 in which R is phenyl.

5. The process of claim 1 in which R is hydrogen.

6. The process of preparing acetylene polymers containing small amounts of chromium which comprises preparing an acetylene magnesium halide by treating an acetylene containing an acetylenic hydrogen atom with an organo-magnesium halide, and treating said acetylene magnesium halide with chromium trichloride.

7. The method of claim 1 in which the chromium halide and R—C≡C—MgX are employed in proportions of 1 mole of the former to 2 to 20 moles of the latter.

8. The method of claim 7 in which the resulting product is hydrolyzed.

9. The method of claim 7 in which about 2 to about 8 moles of R—C≡C—MgX are employed.

10. A solid polymer of phenylacetylene possessing graphite-like properties with a molecular weight of the order of 600 to 1000 and softening point of the order of 175° to 200° C. and containing small amounts of chromium.

11. A solid polymer resulting from treatment of a polymer of a hydrocarbon acetylene containing small amounts of chromium and having graphite-like properties and being amorphous as determined by X-ray diffraction pattern with an aqueous dilute acidic medium to introduce oxygen as hydroxyl at the terminal unsaturation.

12. The process of polymerizing acetylenes which comprises heating same to about 125 to 175° C. in the presence of metallic aluminum, aluminum trihalide, and chromium trihalide.

13. The process of claim 1 in which the transition metal halide is nickel bromide.

14. A solid polymer of a hydrocarbon acetylene, said polymer containing a small amount of chemically bound chromium resulting from use of chromium halide in the polymerization and containing aromatic structures formed from the acetylenic carbon atoms and possessing graphite-like properties and which is amorphous as determined by X-ray diffraction pattern.

15. An amorphous, pyridine-soluble oxygen and chromium containing solid polymer of phenylacetylene having an empirical formula approximating $C_{108}H_{94}O_{14}Cr$ in which the main polymeric structure is due to polymerization of the acetylenic bond and oxygen and chromium are attached to the main structure.

16. A polymer of phenyl acetylene possessing graphite-like properties and having an analysis corresponding to an empirical formula of $C_{24}H_{15-16}O$.

References Cited in the file of this patent

UNITED STATES PATENTS

| | | |
|---|---|---|
| 2,082,568 | Carothers et al. | June 1, 1937 |
| 2,363,910 | Swaney | Nov. 28, 1944 |
| 2,644,801 | D'Alelio | July 7, 1953 |
| 2,697,028 | Baker | Dec. 14, 1954 |

FOREIGN PATENTS

| | | |
|---|---|---|
| 385,963 | Great Britain | Dec. 28, 1932 |
| 530,753 | Italy | July 15, 1955 |
| 546,151 | Belgium | Sept. 17, 1956 |